US008755682B2

(12) United States Patent
Shorr et al.

(10) Patent No.: US 8,755,682 B2
(45) Date of Patent: Jun. 17, 2014

(54) MIXING HEADER FOR FLUID HEATER (75) Inventors: Cory D. Shorr, South Jordan, UT (US);
John M. Roach, Herriman, UT (US);
Kelly Davis, American Fork, UT (US)

(73) Assignee: Trebor International, West Jordan, UT (US)

( * ) Notice: Subject to any disclaimer, the term of this patent is extended or adjusted under 35 U.S.C. 154(b) by 79 days.

(21) Appl. No.: 13/551,890

(22) Filed: Jul. 18, 2012

(65) Prior Publication Data
US 2014/0023353 A1 Jan. 23, 2014

(51) Int. Cl.
*F24H 1/10* (2006.01)

(52) U.S. Cl.
USPC ............................ 392/478; 392/465; 392/485

(58) Field of Classification Search
None
See application file for complete search history.

(56) References Cited

U.S. PATENT DOCUMENTS

| 1,113,041 | A |   | 10/1914 | Murphy |       |
|-----------|---|---|---------|--------|-------|
| 1,657,891 | A |   | 1/1928  | Miller |       |
| 1,858,665 | A |   | 6/1931  | Gibson |       |
| 1,833,876 | A |   | 11/1931 | McGrath |      |
| 2,240,104 | A |   | 4/1941  | Uhri |         |
| 2,419,429 | A | * | 4/1947  | Voiles | 392/486 |
| 3,582,048 | A |   | 6/1971  | Sarem |        |
| 3,777,117 | A | * | 12/1973 | Othmer | 392/469 |
| 3,782,456 | A | * | 1/1974  | Gusmer | 165/164 |
| 3,943,330 | A | * | 3/1976  | Pollock et al. | 392/387 |
| 4,154,296 | A |   | 5/1979  | Fijas |        |
| 4,179,222 | A |   | 12/1979 | Strom |        |
| 4,414,464 | A | * | 11/1983 | Cloutier | 392/487 |
| 4,441,823 | A |   | 4/1984  | Power |        |
| 4,567,350 | A | * | 1/1986  | Todd, Jr. | 392/486 |
| 4,614,440 | A |   | 9/1986  | King |         |
| 4,747,697 | A |   | 5/1988  | Kojima |       |
| 4,929,088 | A |   | 5/1990  | Smith |        |
| 5,495,872 | A | * | 3/1996  | Gallagher et al. | 138/44 |
| 5,907,663 | A | * | 5/1999  | Lee | 392/407 |
| 5,971,402 | A |   | 10/1999 | Northrop |     |
| 6,000,841 | A |   | 12/1999 | Cooke |        |
| 6,119,769 | A |   | 9/2000  | Yu |           |
| 6,144,802 | A | * | 11/2000 | Kim | 392/479 |
| 6,145,544 | A | * | 11/2000 | Dutertre et al. | 138/39 |
| 6,330,395 | B1 | * | 12/2001 | Wu | 392/494 |
| 6,447,158 | B1 |  | 9/2002  | Karkas |       |
| 6,533,030 | B2 |  | 3/2003  | Mitrovic |     |
| 6,615,872 | B2 |  | 9/2003  | Goebel |       |
| 7,046,922 | B1 | * | 5/2006  | Sturm et al. | 392/482 |
| 7,088,915 | B1 | * | 8/2006  | Sturm et al. | 392/466 |
| 7,621,670 | B1 | * | 11/2009 | England et al. | 366/340 |
| 7,822,326 | B2 | * | 10/2010 | Commette et al. | 392/484 |
| 7,878,705 | B2 |  | 2/2011  | Schauerte |    |
| 8,033,714 | B2 |  | 10/2011 | Nishioka et al. | |
| 8,096,129 | B2 |  | 1/2012  | Francis |      |
| 8,136,980 | B2 |  | 3/2012  | Smith |        |

(Continued)

FOREIGN PATENT DOCUMENTS

EP 282148 9/1988
JP 05288487 11/1993

*Primary Examiner* — Thor Campbell
(74) *Attorney, Agent, or Firm* — Workman Nydegger (57) ABSTRACT In one example, a mixing header includes a body that defines a fluid passage having an inlet side and an outlet side. The mixing header also includes a flow conditioning element that is connected to the body and arranged for fluid communication with the fluid passage. The flow conditioning element also includes a plurality of elements each connected to, and extending outwardly from, a hub.

18 Claims, 5 Drawing Sheets

(56) References Cited

U.S. PATENT DOCUMENTS

| | | |
|---|---|---|
| 8,249,437 B2 * | 8/2012 | Commette et al. ............ 392/484 |
| 2004/0256375 A1 * | 12/2004 | Loktev et al. ................. 219/438 |
| 2007/0247969 A1 | 10/2007 | Dougherty |
| 2010/0260009 A1 | 10/2010 | Kingsford |
| 2011/0042938 A1 * | 2/2011 | Gallagher et al. ....... 285/148.13 |
| 2012/0247223 A1 * | 10/2012 | Sawchuk et al. ................ 73/861 |
| 2013/0153074 A1 * | 6/2013 | Gurr et al. ....................... 138/39 |

\* cited by examiner

MIXING HEADER FOR FLUID HEATER

RELATED APPLICATIONS

This application is related to U.S. Pat. No. 5,971,402, entitled ULTRA-PURE, NON-REACTIVE, ELEVATED TEMPERATURE SEAL ASSEMBLY, incorporated herein in its entirety by this reference.

BACKGROUND

1. Field of the Present Disclosure

The present disclosure is generally concerned with fluid systems and fluid system components. More specifically, the disclosed embodiments concern fluid system components configured to desirably modify one or more characteristics of a fluid flow in connection with which the fluid system component is employed. In one particular example, a mixing header is provided that is configured to disrupt a flow of fluid passing through the mixing header.

2. Description of Related Art

The performance of a fluid heater may be considered in terms of the efficiency of the fluid heater, that is, the effectiveness of the fluid heater in transferring heat to an associated fluid flow. Various factors, such as the physical configuration of the fluid heater and/or the physical configuration of other components in a fluid system for example, may impart undesirable characteristics to the fluid flow that can, in turn, adversely affect the performance of the fluid heater.

BRIEF SUMMARY OF ASPECTS OF EXAMPLE EMBODIMENTS

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Disclosed embodiments are generally concerned with fluid systems and associated components. Embodiments within the scope of this disclosure may include any one or more of the following elements, and features of elements, in any combination: a mixing header; a mixing header that includes one or more elements configured to disrupt a flow of fluid passing through the mixing header; a mixing header that includes one or more static elements configured to disrupt a flow of fluid passing through the mixing header; a mixing header that includes one or more movable elements configured to disrupt a flow of fluid passing through the mixing header; a mixing header that includes a combination of static elements and movable elements collectively configured to disrupt a flow of fluid passing through the mixing header; a heating element tube; a mixing header that includes one or more vanes, propellers, blades, impellers and/or or other structures that serve to disrupt a flow of fluid passing through the mixing header; a mixing header configured to prevent incoming fluid from flowing straight through the middle of a tube with which the mixing header is employed; a means for disrupting fluid flow; a means for disrupting fluid flow which may facilitate one or more of limitation of the size and formation of a boundary layer around a tube inside diameter, a reduction in boiling or phase change of the fluid to be heated, improved heat exchange between a heating element and associated fluid flow, improvement of an overall efficiency of a heating element tube, reduction in the temperature of a heating element, and improvement in the life of a heating element; a mixing header substantially made of plastic; a mixing header substantially made of a polymer, one example of which is polytetrafluoroethylene (PTFE); a mixing header having a single piece construction.

BRIEF DESCRIPTION OF THE DRAWINGS

The appended drawings contain figures of some example embodiments to further clarify various aspects of the present disclosure. It will be appreciated that these drawings depict only some embodiments of the disclosure and are not intended to limit its scope in any way. The disclosure will be described and explained with additional specificity and detail through the use of the accompanying drawings in which.

DETAILED DESCRIPTION OF SOME EXAMPLE EMBODIMENTS

The present disclosure is generally concerned with fluid systems and fluid system components. More specifically, the disclosed embodiments concern fluid system components configured to desirably modify one or more characteristics of a fluid flow in connection with which the fluid system component is employed. In one particular example, a mixing header is provided that is configured to disrupt a flow of fluid within which the mixing header is positioned. The mixing header may comprise an element of a fluid heater.

A. General Aspects of Some Example Embodiments

In general, fluid system components disclosed herein may used in a variety of different applications, and may be particularly useful in fluid systems for semiconductor manufacturing processes. Such fluid systems may employ, for example, deionized (DI) water, corrosive agents and materials including but not limited to acids and bases, gases, other fluids, and combinations of any of the foregoing. Such fluids may be hot, reactive, and/or pure fluids. The temperatures of fluids employed in such systems, such as acids for example, may be anywhere in the range of about 1 degree C. to about 180 degrees C., or in any sub-range falling within that range including, for example, about 100 degrees C. to about 180 degrees C. These temperatures are provided by way of example, and in some instances may be even higher than about 180 degrees C. As another example, some systems may employ process fluids that are maintained at a temperature of about 120 degrees C., or higher. Note that as used herein, "fluid" embraces gases, liquids, combinations of gases and liquids, and combinations of one or more gases and/or one or more liquids with solids.

The fluid system components disclosed herein may be constructed with a variety of components and materials including, but not limited to, non-reactive and substantially non-reactive materials, non-metallic and substantially non-metallic materials, rubber, plastics such as polymers, and composites. It should be noted that non-reactive and substantially non-reactive materials embrace a variety of materials, including both metals, such as stainless steel for example, as well as non-metallic materials, such as plastics for example. Examples of the aforementioned polymers may include perfluoroalkoxy (PFA) and polytetrafluoroethylene (PTFE). In certain applications, metals such as stainless steel, copper, titanium, brass, nickel, aluminum, and alloys and combinations of any of the foregoing metals, may be used.

B. Overview of an Example Embodiment and Environment

Figures 1, 2:
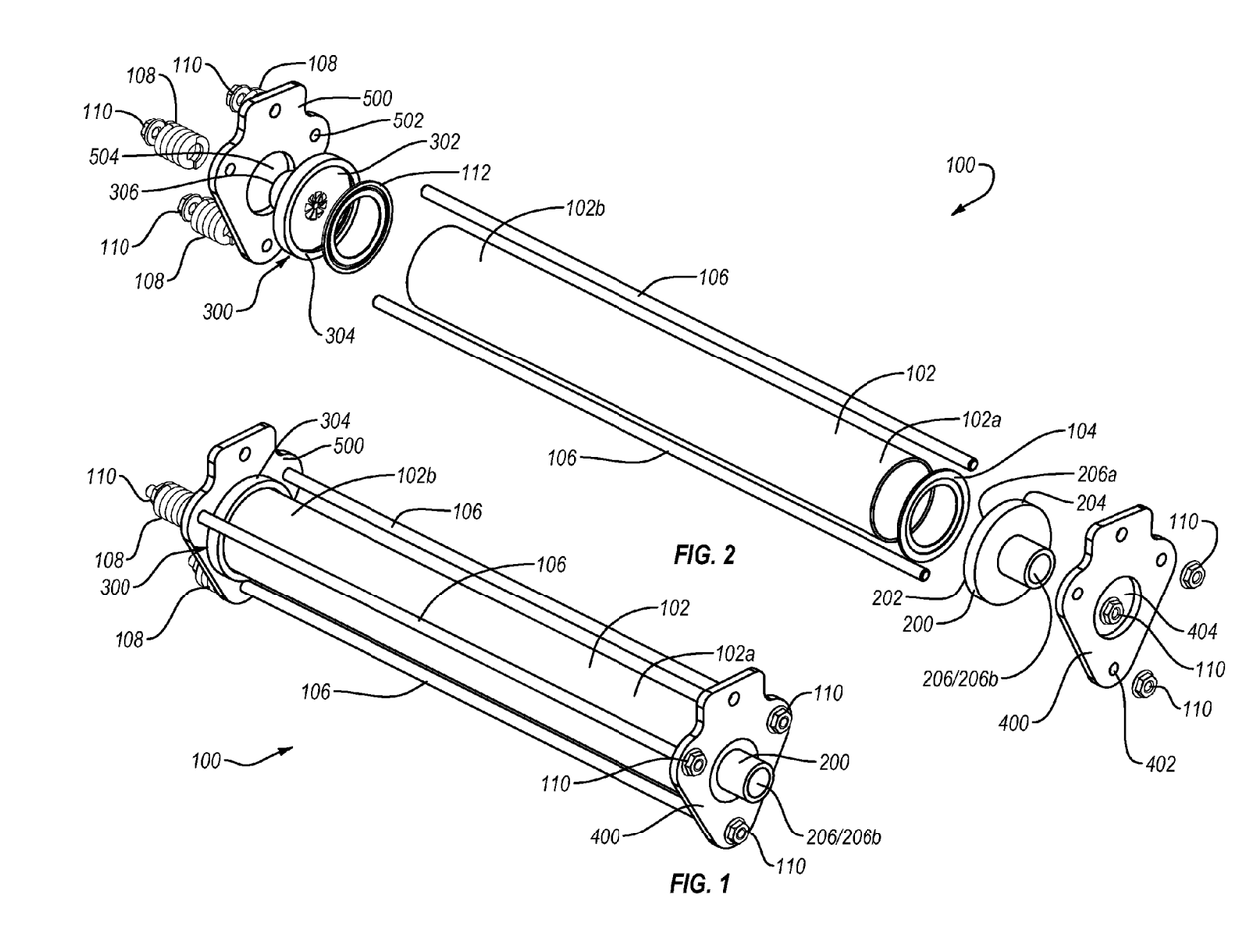
FIG. 1 is a perspective view of an example fluid heater that includes a mixing header.
FIG. 2 is an exploded view of an example fluid heater that includes a mixing header.

With particular reference now to FIGS. 1 and 2, a brief overview is provided concerning an example mixing header and an example of a device in which a mixing header may be employed.

More specifically, FIGS. 1 and 2 disclose an example fluid heater 100 having a heating element tube 102 that is configured to removably receive a heating element (not shown). In general, the heating element tube 102 is configured and arranged to enable fluid entering the fluid heater 100 to contact the heating element (not shown) as the fluid passes through the fluid heater 100. The fluid heater 100 further includes a first header 200 and a second header 300 that are positioned at, and sealed to, respective first and second ends 102*a* and 102*b* of the heating element tube 102. In general, the first and second headers 200 and 300 are configured and arranged for fluid communication with the interior of the heating element tube 102. As well, and except as noted herein, the first and second headers 200 and 300 may be substantially the same as each other in terms of their size and configuration. More specifically, and as disclosed in more detail elsewhere herein, the second header 300 is configured to implement one more desired effects with regard to fluid passing through the second header 300 and into the heating element tube 102.

Figure 3:
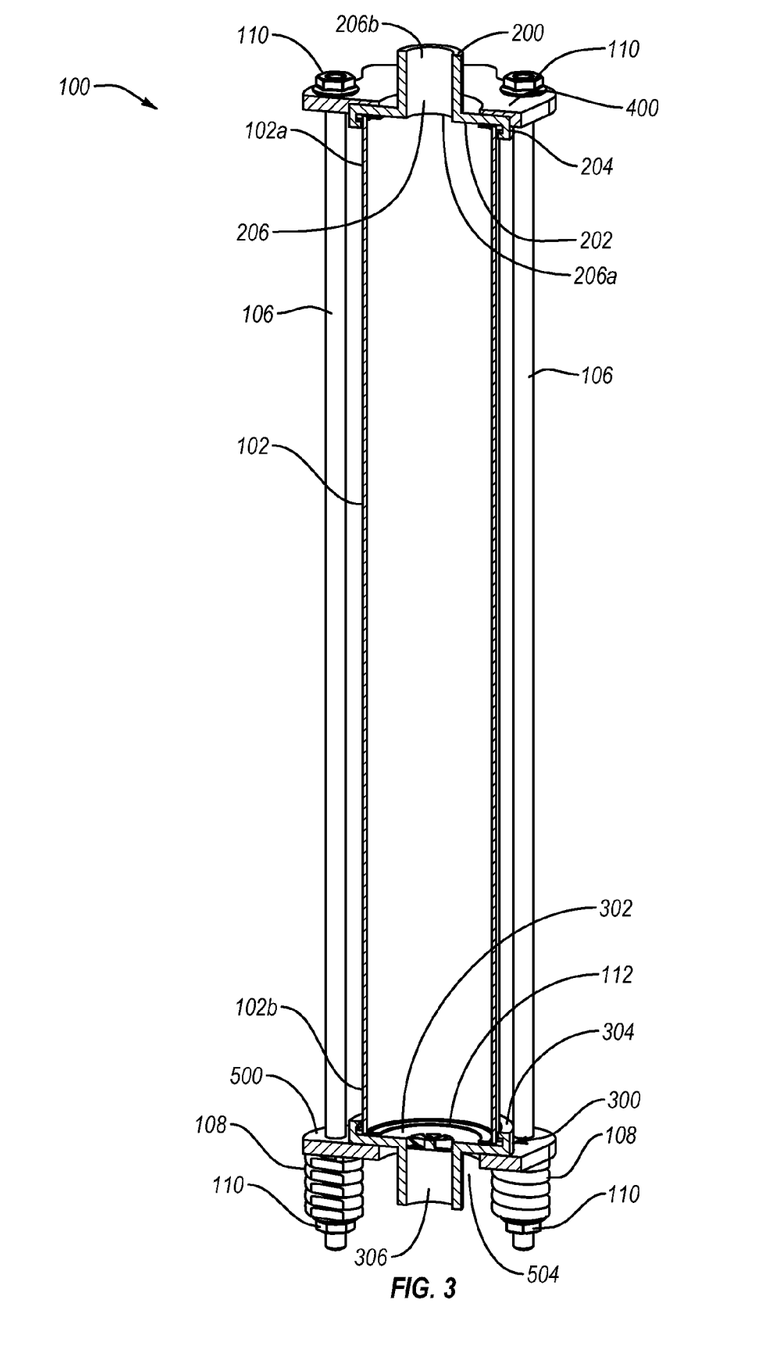
FIG. 3 is a section view of an example fluid heater.
Figure 4:
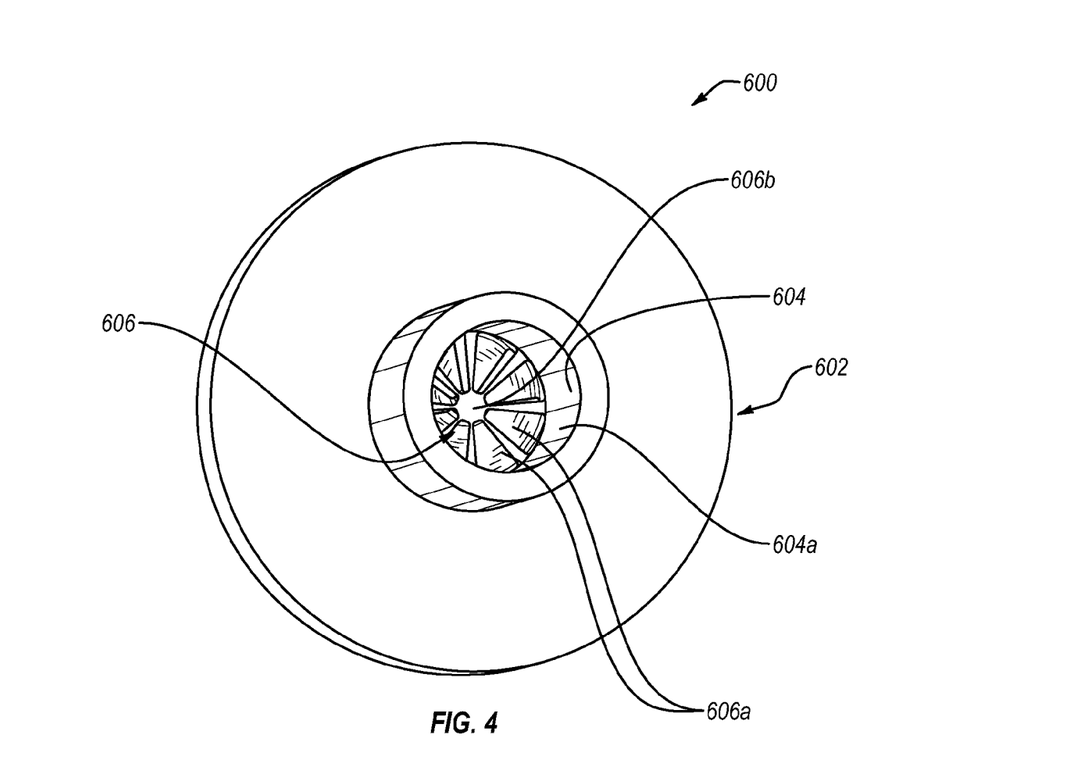
FIG. 4 is a top perspective view of an example mixing header.
Figure 5:
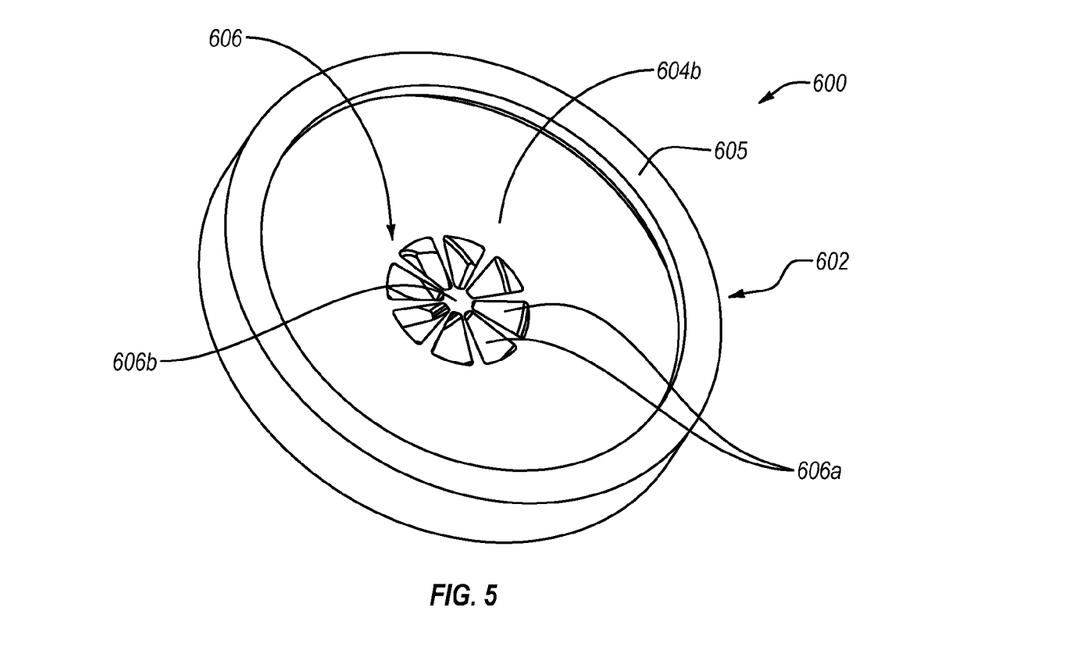
FIG. 5 is a bottom perspective view of an example mixing header.
Figure 6:
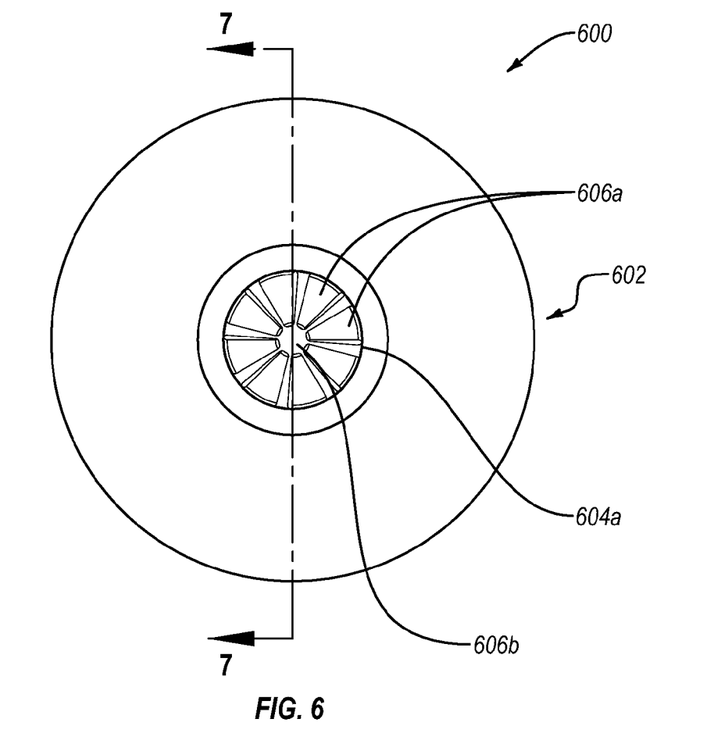
FIG. 6 is a top view of an example mixing header.
Figure 7:
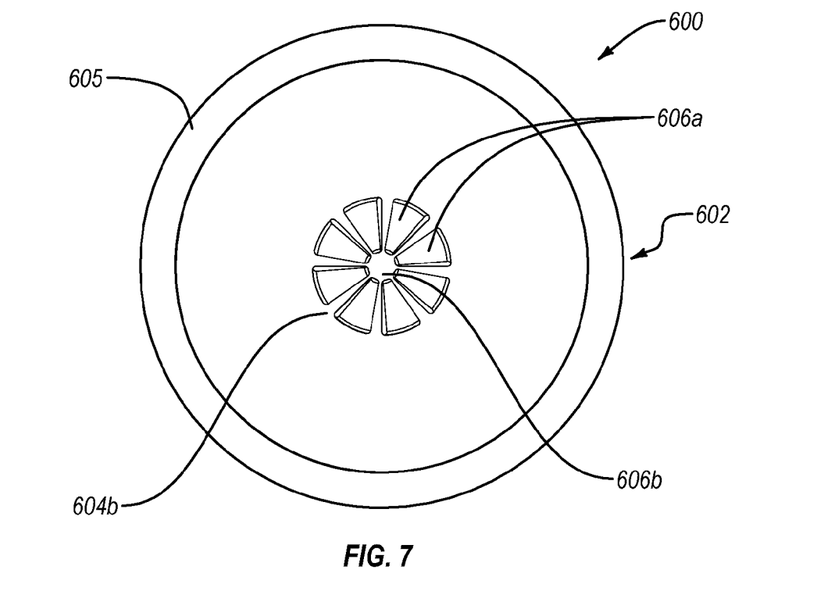
FIG. 7 is a bottom view of an example mixing header.
Figure 8:
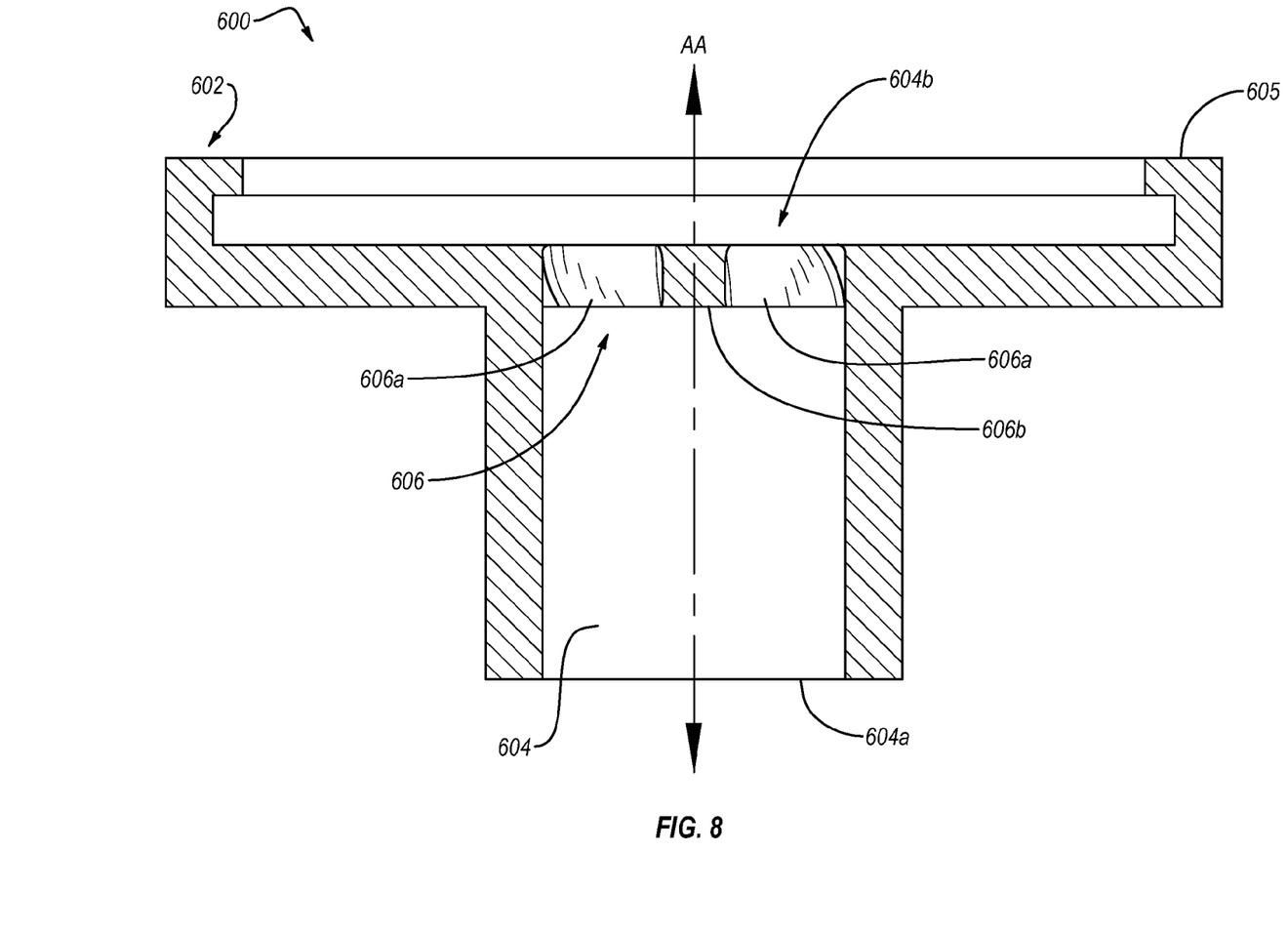
FIG. 8 is a section view of an example mixing header.

The fluid heater 100 further includes first and second header plates 400 and 500 that are positioned proximate the first and second ends 102*a* and 102*b* of the heating element tube 102, and that cooperate to aid in retention of the first header 200, second header 300, and heating element tube 102 in position relative to each other. More particularly, the first header 200 and second header 300 may be connected to each other with a plurality of tie bolts 106 (for purposes of clarity, one tie bolt 106 is removed in FIG. 2). In the example of FIGS. 1-3, one or more resilient elements 108 are positioned so as to exert a compressive force on the header plates 400 and 500 when nuts 110 on the tie bolts 106 are tightened. Among other things, this compressive force may help to seal the heating element tube 102 to the first and second headers 200 and 300 so that little, or no, leakage occurs when the interior of the heating element tube 102 is exposed to pressurized fluid. As well, the resilient elements 108, which may take the form of springs, can also help to compensate for misalignment and/or differences in length of components such as the header plates 400 and 500, heating element tube 102, and/or first and second headers 200 and 300.

C. Details of Aspects of an Example Embodiment and Environment

Directing more particular attention now to FIGS. 1-3, details are provided concerning the example fluid heater 100. With reference first to the heating element tube, the heating element tube 102 may be constructed from any suitable non-reactive, or substantially non-reactive, material(s), one example of which is corundum, or synthetic sapphire. In other embodiments, crystalline materials such as quartz may be employed in the construction of the heating element tube 102. In yet other embodiments, the heating element tube 102 may be constructed of a polymer.

A first end 102*a* of the heating element tube 102 is seated on a seal 104 that is positioned on the first header 200. Both the seal 104 and first header 200 may be constructed from any suitable non-reactive, or substantially non-reactive, material(s), examples of which are disclosed herein. In some embodiments, the seal 104 and/or the first header 200 are constructed from a polymer, such as PFA or PTFE for example.

The first header 200 may include a recess (not shown) and/or other structural feature(s) configured and arranged to assist in retention of the seal 104 in a desired position and location. In one example, the recess has substantially the same dimensions as the seal 104 so that when positioned in the recess, the seal 104 is substantially flush with an upper surface of the first header 200. In other examples, some or all of the seal 104 may be positioned above the lower surface 202 of the first header 200. As well, the first header 200 may include a lip 204 that may assist in reducing, or preventing, radial movement of the heating element tube 102 relative to the first header 200. In some embodiments, the inner diameter of the lip 204 is about the same as the outer diameter of the heating element tube 102, although this configuration is not necessary.

The first header 200 may additionally define a fluid passage 206 that is configured for fluid communication with an interior of the heating element tube 102. In the example of FIGS. 1 and 2, the fluid passage 206 has an inlet side 206*a* located proximate the interior of the heating element tube 102, and an outlet side 206*b* located opposite the inlet side 206*a*. Depending upon the application, the designations of the inlet side and outlet side may be reversed.

Aspects of its geometry, such as the length and inner diameter of the fluid passage 206, can be implemented as desired to suit the requirements of the particular application in which the fluid heater 100 is expected to be used. In at least some instances, the inner diameter of the fluid passage 206 is substantially constant over a substantial portion of the length of the fluid passage 206. In other embodiments, the inner diameter of the fluid passage 206 may vary over at least a portion of the length of the fluid passage 206. For example, the inner diameter of the portion of the fluid passage 206 proximate the interior of the heating element tube 102 may be greater, or less than, the inner diameter of the portion of the fluid passage 206 remote from the interior of the heating element tube 102. More generally, the fluid passage 206 may be constructed as desired to implement particular flow characteristics.

With continued reference to FIGS. 1 and 2, the fluid heater 100 further includes a second header 300, which may be implemented as a mixing header. Similar to the case of the first header 200, a seal 112 may be provided that is positioned upon, or at least partially received in, an upper surface 302 of the second header 300. Both the seal 112 and the second header 300 may be constructed from any suitable non-reactive, or substantially non-reactive, material(s), examples of which are disclosed herein. In some embodiments, the seal 112 and/or the first header 300 are constructed from a polymer, such as PFA or PTFE for example.

In the disclosed example, the seal 112 is in the form of a sealing ring having a generally U-shaped cross section that is configured to receive the second end 102b of the heating element tube 102. In one alternative arrangement, the second header 300 may include a recess (not shown) and/or other structural feature(s) configured and arranged to assist in retention of the seal 112 in a desired position and location. In one example, the recess has substantially the same dimensions as the seal 112 so that when positioned in the recess, the seal 112 is substantially flush with the upper surface 302 of the second header 300.

As further indicated in FIGS. 1 and 2, the second header 300 may include an element, such as lip 304 for example, that may assist in reducing, or preventing, at least some radial movement of the heating element tube 102 relative to the second header 300. In some embodiments, the inner diameter of the lip 304 is about the same as the outer diameter of the heating element tube 102, although this configuration is not necessary. Similar to the case of the first header 200, the second header 300 may include a fluid passage 306 configured and arranged for fluid communication with the interior of the heating element tube 102. Further details concerning the structure of some example embodiments of the header 300 are disclosed elsewhere herein.

As noted earlier, the first and second header plates 400 and 500 cooperate with tie bolts 106, resilient elements 108, and nuts 110 to apply a compressive force sufficient to seal the first and second headers 200 and 300 to the heating element tube 102 so that little or no leakage occurs at the interfaces of the first and second headers 200 and 300 with the heating element tube 102. The presence of one or more compressible seals, such as seal 112 and seal 104, interposed between the heating element tube 102 and the first and second headers 200 and 300, respectively, contributes to the prevention of leakage.

The header plates 400 and 500, tie bolts 106, resilient elements 108, and nuts 110 may be constructed of any suitable material including, but not limited to, non-reactive and substantially non-reactive materials, non-metallic and substantially non-metallic materials, plastics such as polymers, and composites. It should be noted that non-reactive and substantially non-reactive materials embrace a variety of materials, including both metals, such as stainless steel for example, as well as non-metallic materials, such as plastics for example. The aforementioned polymers may include, for example, perfluoroalkoxy (PFA) and polytetrafluoroethylene (PTFE). In certain applications, metals such as steel, copper, titanium, brass, nickel, aluminum, and alloys and combinations of any of the foregoing metals, may be used.

In the disclosed example, each of the header plates 400 and 500 includes a plurality of holes 402 and 502, respectively, that are sized and configured to removably receive a corresponding tie bolt 106. While the example of FIGS. 1 and 2 illustrate header plates 400 and 500 having three holes 402 and 502, respectively, more or fewer holes and, accordingly, tie bolts 106, may be employed. In some instances at least, the holes 402 and 502 are equally spaced about a longitudinal axis defined by the corresponding header plates 400 and 500, although this arrangement need not be employed.

In addition to the holes 402 and 502, the header plates 400 and 500, respectively, each define a respective opening 404 and 504 in which a corresponding portion of headers 200 and 300 is received. With reference to header plate 400, fluid passage 206 extends through opening 404 while, with reference to header plate 500, the fluid passage 306 extends through opening 504. Each opening 404 and 504 may be configured so that corresponding fluid passages 206 and 306 fit relatively closely within the openings 404 and 504, respectively. In at least some embodiments, the outside diameter of the fluid passage 206 is about the same as the inside diameter of opening 404, while the outside diameter of the fluid passage 306 is about the same as the inside diameter of opening 504. Among other things, this configuration and arrangement may help to reduce, or prevent, radial movement of the first and second headers 200 and 300 relative to the header plates 400 and 500, respectively.

D. Details Concerning Aspects of an Example Mixing Header

With continuing attention to FIGS. 1-3, and directing attention now to FIGS. 4-8 as well, details are provided concerning an example mixing header, denoted generally at 600. As some aspects of example mixing headers are addressed elsewhere herein, those aspects are not addressed in detail in the following discussion.

In terms of its structure, the mixing header 600 may be constructed as a single piece that has been cut, molded, machined, or otherwise formed from a suitable material. In other embodiments, the mixing header 600 may comprise a plurality of pieces attached together to form the mixing header 600. In still other embodiments, the mixing header 600 may be integrated together with a header plate, such as header plate 500 for example.

As indicated in FIGS. 4-8, the mixing header 600 includes a body 602 that defines a fluid passage 604 having an inlet side 604a in fluid communication with an outlet side 604b. It should be noted that the designations inlet side and outlet side are employed for the sake of discussion and are not intended to limit the scope of the invention in any way. Consistently, in other embodiments, 604a may serve as the outlet side and 604b may serve as the inlet side. The body may also include a circumferential lip 605.

A flow conditioning element 606 is arranged for fluid communication with the fluid passage 604. In general, and as discussed in further detail below, the flow conditioning element 606 may impart one or more desirable characteristics to a flow of fluid passing through the flow conditioning element 606.

While, in the disclosed example, the flow conditioning element 606 is located near the outlet side 604b of the fluid passage 604, other embodiments may employ a different location for the flow conditioning element 606. For example, the flow conditioning element 606 may be disposed between the inlet side 604a and the outlet side 604b, or may be located near the inlet side 604a. In yet other embodiments, the flow conditioning element 606 may be spaced apart from the fluid passage 604. More generally, the scope of the invention is not limited to any particular location of the flow conditioning element 606. As well, some embodiments may employ multiple flow conditioning elements 606, which may or may not each have the same configuration.

Depending upon the flow characteristic(s) desired to be achieved, the flow conditioning element may have a variety of different configurations. In the example of FIGS. 4-8, the flow conditioning element 606 is configured to introduce a disruption in a flow of fluid passing through the mixing header 600. To that end, the flow conditioning element 606 includes a plurality of vanes 606a that are attached to, and extend axially outwardly from, a hub 606b. In some instances, the vanes 606a may be generally equally spaced about the hub 606b. The hub 606b may or may not be coaxial with a central axis of a heating element tube. The vanes 606a may all have substantially the same configuration. Other embodiments may include vanes having different configurations.

As well, the vanes 606a may all be oriented in the same way, or substantially the same way. By way of illustration, and as disclosed in FIGS. 4-8, each vane 606a is attached to, and extends outwardly from, the hub 606b, and each vane 606a lies in a corresponding plane that is tilted at an angle relative to a longitudinal axis AA defined by the flow conditioning element 606 (see FIG. 8), where the angle is between about 0 degrees and about 90 degrees. Each of the planes is parallel, or substantially parallel, to each of the respective planes in which the other vanes lie. In yet other embodiments however, the orientation of the vanes may vary so that at least one vane has an orientation that is different from an orientation of at least one other vane.

Among other things, the size, number, orientation, and spacing of vanes 606a employed may be implemented as dictated by operational or other requirements. In some embodiments, at least one vane may differ from at least one other vane in one or more of their respective sizes, configurations, and orientations. It should be noted that the particular geometry of the vanes 606a indicated in FIGS. 4-8, is presented only by way of example, and other vane geometries that are effective in implementing one or more desired flow characteristics may alternatively be employed. For example, the angle of the vanes 606a, relative to plane that is substantially perpendicular to axis AA, may be selected as desired.

Although an outside diameter of the flow conditioning element 606 may be about the same size as an inside diameter of the fluid passage 604, it will be appreciated that the open area of the flow conditioning element 606 is relatively smaller than the cross-sectional area of the fluid passage 604, by virtue of the presence of the vanes 606a. Thus, one flow characteristic that may be imparted by the flow conditioning element 606 is a relative increase in the velocity of fluid from the time the fluid enters the mixing header 600 until the time that fluid exits the mixing header 600. This is due to the relationship: Q=V*A, where: Q=flow rate, A=area, and V=fluid velocity. Thus, if Q is fixed, and A changes, there will be a corresponding change in V.

While the embodiment of FIG. 4-8 discloses an arrangement where one or more of the vanes 606a are fixed in position, alternative configurations may be employed. In one alternative embodiment, a flow conditioning element has a "propeller" type configuration with one or more vanes that are rotatable about a central axis. The rotation of the vanes may be imparted by a flow of fluid through the flow conditioning element.

In still other embodiments, a flow conditioning element may take the form of one or more vanes, blades, fins and/or other structures affixed to, or integrated with, the inner walls of the fluid passage 604. Such structures may be used instead of, or in conjunction with, a flow conditioning element such as flow conditioning element 606.

As the disclosure herein makes clear, embodiments of the flow conditioning element are example structural implementations of a means for disrupting fluid flow. Such structural implementations are provided only by way of example, and any other structure(s) capable of implementing comparable functionality are considered to be within the scope of this disclosure, and may be employed.

E. Operational Aspects of an Example Mixing Header

With continued reference to the Figures, further details are provided concerning operational aspects of some example embodiments. In general, the configuration of the mixing header, particularly the flow conditioning element, is such that the mixing header may, among other things, serve to mix the fluid entering the heating element tube by way of the mixing header. Such mixing may prevent the incoming fluid from flowing straight through the middle of the heating element tube.

More specifically, embodiments of the mixing header may limit the size and formation of the boundary layer around the heating element tube inside diameter. In this way, the mixing header may thus enable a reduction in boiling or phase change of the fluid to be heated, and thereby promote improved heat exchange between the heating element and the fluid so as to improve the overall efficiency of the heating element tube. Such improved heat exchange may also result in a reduction in the temperature of the heating element, and a consequent improvement in the life of the heating element.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:

1. A fluid heater, comprising:
    a heating element tube;
    first and second headers disposed proximate respective first and second ends of the heating element tube, each header defining a respective fluid passage arranged for fluid communication with the heating element tube, and the second header comprising:
        a body that defines a fluid passage having an inlet side and an outlet side, the fluid passage arranged for fluid communication with an interior of the heating element tube; and
        a flow conditioning element connected to the body and arranged for fluid communication with the fluid passage, the flow conditioning element including a plurality of elements each connected to the body proximate an inner wall of the fluid passage defined by the body;
    a first seal interposed between the first end of the heating element tube and the first header;
    a second seal interposed between the second end of the heating element tube and the second header;
    a first header plate disposed proximate the first header;
    a second header plate disposed proximate the second header;
    a plurality of tie bolts connecting the first and second headers to each other; and
    a spring disposed on each tie bolt and arranged to be compressed by a corresponding nut on that tie bolt as the nut is tightened on the tie bolt.

2. The fluid heater as recited in claim 1, wherein the plurality of elements comprises a plurality of vanes, each of which is connected at one end to a hub.

3. The fluid heater as recited in claim 2, wherein each of the vanes has a first end connected to the hub of the flow conditioning element and a second end connected to the body proximate an inner wall of the fluid passage defined by the body.

4. The fluid heater as recited in claim 3, wherein each of the plurality of vanes resides in a different respective plane, and the planes are parallel to each other.

5. The fluid heater as recited in claim 4, wherein in operation, the flow conditioning element
    serves to disrupt fluid flow so as to limit or prevent formation of a boundary layer in the flow of fluid exiting the body.

6. The fluid heater as recited in claim 5, wherein limitation or prevention of the formation of a boundary layer limits the extent to which the flow of fluid exiting the second header experiences a phase change.

7. The fluid heater as recited in claim 3, wherein each vane is tilted at an angle relative to a longitudinal axis defined by the mixing header, and the angle is between about 0 degrees and about 90 degrees.

8. The fluid heater as recited in claim 7, wherein each vane is tilted at an angle substantially greater than 0 degrees.

9. The fluid heater as recited in claim 3, wherein the plurality of vanes comprises eight vanes.

10. The fluid heater as recited in claim 1, wherein the flow conditioning element is located proximate the outlet side of the fluid passage defined by the body.

11. The fluid heater as recited in claim 1, wherein an open area defined by the flow conditioning element is less than a cross-sectional area defined by the fluid passage defined by the body.

12. The fluid heater as recited in claim 1, wherein each of the elements has substantially the same size and configuration as the other elements.

13. The fluid heater as recited in claim 1, wherein an inside diameter of the heating element tube is larger than an inside diameter of the fluid passages respectively defined by the first and second headers.

14. The fluid heater as recited in claim 1, wherein the heating element tube is configured to removably receive a heating element.

15. The fluid heater as recited in claim 1, wherein the first and second headers each comprise a substantially non-reactive material.

16. The fluid heater as recited in claim 15, wherein the substantially non-reactive material comprises a plastic.

17. The fluid heater as recited in claim 1, further comprising an additional fluid conditioning element arranged for fluid communication with the heating element tube.

18. The fluid heater as recited in claim 1, wherein the body comprises a first portion that defines the fluid passage and a second portion that defines an additional fluid passage that is in communication with the fluid passage, wherein the second portion is connected to the first portion, and wherein an inside diameter of the fluid passage is smaller than an inside diameter of the additional fluid passage.

\* \* \* \* \*

UNITED STATES PATENT AND TRADEMARK OFFICE
CERTIFICATE OF CORRECTION

PATENT NO.         : 8,755,682 B2                                         Page 1 of 1
APPLICATION NO.    : 13/551890
DATED              : June 17, 2014
INVENTOR(S)        : Shorr et al.

It is certified that error appears in the above-identified patent and that said Letters Patent is hereby corrected as shown below:

In the Specification

Column 2
Line 53, change "herein may used" to --herein may be used--

Column 3
Line 43, change "one more desired effects" to --one or more desired effects--

Column 5
Line 1, change "first header 300" to --second header 300--

Signed and Sealed this
Fourteenth Day of July, 2015

Michelle K. Lee
*Director of the United States Patent and Trademark Office*